United States Patent
Golechha et al.

(10) Patent No.: US 8,400,995 B2
(45) Date of Patent: Mar. 19, 2013

(54) SYSTEM AND METHOD FOR DESCRAMBLING DATA

(75) Inventors: Sachin Kumar Golechha, Kharagpur (IN); Devesh Kunwar, Greater Noida (IN)

(73) Assignee: Freescale Semiconductor, Inc., Austin, TX (US)

( * ) Notice: Subject to any disclaimer, the term of this patent is extended or adjusted under 35 U.S.C. 154(b) by 274 days.

(21) Appl. No.: 12/888,363

(22) Filed: Sep. 22, 2010

(65) Prior Publication Data

US 2012/0069849 A1   Mar. 22, 2012

(51) Int. Cl.
*H04B 7/216* (2006.01)
*H04L 9/00* (2006.01)

(52) U.S. Cl. ......................... 370/342; 380/268
(58) Field of Classification Search ........................ None
See application file for complete search history.

(56) References Cited

U.S. PATENT DOCUMENTS

| | | | | |
|---|---|---|---|---|
| 4,882,579 A * | 11/1989 | Siwiak | ........................... | 370/342 |
| 6,121,791 A | 9/2000 | Abbott | | |
| 6,137,773 A | 10/2000 | Stilwell | | |
| 6,480,504 B1 * | 11/2002 | Wang et al. | ..................... | 370/442 |
| 6,891,880 B2 * | 5/2005 | Abraham | ....................... | 370/335 |
| 6,891,882 B1 * | 5/2005 | Hosur et al. | ................... | 370/342 |
| 6,892,075 B2 | 5/2005 | Ojard | | |
| 7,471,717 B2 * | 12/2008 | Huang | ........................... | 370/342 |
| 7,539,716 B2 | 5/2009 | Torosyan | | |
| 7,765,456 B1 * | 7/2010 | Lilliott et al. | .................. | 370/208 |
| 2002/0186651 A1 * | 12/2002 | Nee | ................... | 370/209 |
| 2003/0103447 A1 * | 6/2003 | Thorson et al. | ................ | 370/209 |
| 2005/0007974 A1 * | 1/2005 | Vasudevan et al. | ........... | 370/320 |
| 2005/0063316 A1 * | 3/2005 | Giancola et al. | ............... | 370/254 |
| 2007/0019535 A1 * | 1/2007 | Sambhwani et al. | ......... | 370/203 |
| 2007/0064590 A1 * | 3/2007 | Prokop et al. | .................. | 370/208 |
| 2008/0059551 A1 | 3/2008 | Van Berkel | | |
| 2008/0137851 A1 | 6/2008 | Shen-Orr | | |
| 2009/0136034 A1 | 5/2009 | Gaal | | |
| 2011/0096765 A1 * | 4/2011 | Chappaz | ........................ | 370/342 |

OTHER PUBLICATIONS

Zhang Ziran, Li Jun, and Li Changxiao, Parallel Processing Design for LTE PUSCH Demodulation and Decoding Based on Multi-Core Processor, http://wwwen.zte.com.cn/endata/magazine/ztecommunications/2009year/no1/articles/200903/t20090319_170887.html, Mar. 19, 2009.

* cited by examiner

*Primary Examiner* — Timothy J Weidner
(74) *Attorney, Agent, or Firm* — Charles Bergere

(57) ABSTRACT

A method and system for negating a series of packed data bytes simultaneously based on conditional flags is used to descramble the data, as opposed to negating each byte with respect to each conditional flag bit. Sets of scrambled binary values are received. A descrambling code that corresponds to a flag bit sequence used to scramble the sets of binary values is generated. Then the sets of scrambled binary values are descrambled using the descrambling code. The method is particularly suitable for use in a wireless base band receiver.

19 Claims, 3 Drawing Sheets

100

| Binary Combination | Descrambling Code |
|---|---|
| 0000 | 0x00 00 00 00 |
| 0001 | 0x00 00 00 FF |
| 0010 | 0x00 00 FF 00 |
| ... | ... |
| 1111 | 0xFF FF FF FF |

104a, 104b, 104c, 104d / 102a, 102b

SYSTEM AND METHOD FOR DESCRAMBLING DATA

BACKGROUND OF THE INVENTION

The present invention relates generally to communication systems and more particularly, to descrambling scrambled data transmitted over a communication channel.

In various contemporary communications systems such as code division multiple access (CDMA), Worldwide Interoperability for Microwave Access (WiMAX), Global System for Mobile Communications (GSM), Long Term Evolution (LTE), and so forth, communication signals belonging to multiple users are transmitted using shared frequency channels. Techniques, such as scrambling of the communication signals, are used to enable transmission of multiple user data on shared frequency channels without inter-user interference.

Scrambling user communication signals entails generating a unique scrambling code (a predefined flag bit sequence) at a transmitter end corresponding to the user. The scrambling code is used to encode the digital equivalents of the communication signals to obtain scrambled user data. The scrambled user data is transmitted to the receiver along with the scrambling code. Subsequently, the receiver decodes the scrambled data using the scrambling code to obtain descrambled data.

Scrambling may be accomplished by performing various mathematical and logical operations on the user data and the scrambling code. For example, a logical bitwise XOR operation is performed at the transmitter on the user data and the scrambling code to obtain scrambled user data. The scrambled data is thereafter transmitted to the receiver. The conversion of the analog user communication signals into scrambled user data includes several processing stages such as cyclic redundancy check (CRC), channel coding, and rate matching. Scrambling is performed as described above to obtain the scrambled user data. Further, modulation, precoding, and Radio Bearer (RB) mapping are performed on the scrambled data before it is transmitted to the receiver.

At the receiver, the received signal is processed to recover the scrambled user data. Due to limitations in communication systems, the probabilistic estimates for each recovered bit of the scrambled data sequence are obtained. The probabilistic estimates, also known as log likelihood ratios (LLRs), soft values, or equalized demodulated probabilistic estimates, indicate the probability of whether a recovered bit of a scrambled user data sequence is binary 1 or 0. Each probability estimate is represented in binary form using n bits, where n is a positive integer. After obtaining the probabilistic estimates, descrambling is performed to obtain the user data. The procedure used to perform descrambling depends on the scrambling procedure used. In the example described above, when the user data is encoded by bitwise logical XOR, the LLRs are negated based on the values of corresponding bits of the scrambling code used to recover the user data. Thus, an LLR is negated when the corresponding bit value of the scrambling code is 1 and it is not negated when the corresponding bit value is 0.

The above descrambling operation including negation is performed by reading one bit of the scrambling code and a corresponding one LLR per operational cycle. Then, based on the value of the scrambling bit, the LLR is negated. Since, the negation is performed by reading one scrambling bit and the corresponding one LLR per operational cycle, the process of descrambling requires many operational cycles for a relatively large number of sets of scrambled data. This leads to a high millions of cycles per second (MCPS), which in turn increases execution time.

It would be advantageous to improve the efficiency of the descrambling process, reduce MCPS, and decrease execution time.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

FIG. 5 is a system for descrambling one or more sets of scrambled binary sequences in accordance with an embodiment of the present invention.

DETAILED DESCRIPTION OF EMBODIMENTS OF THE PRESENT INVENTION

Figure 1:
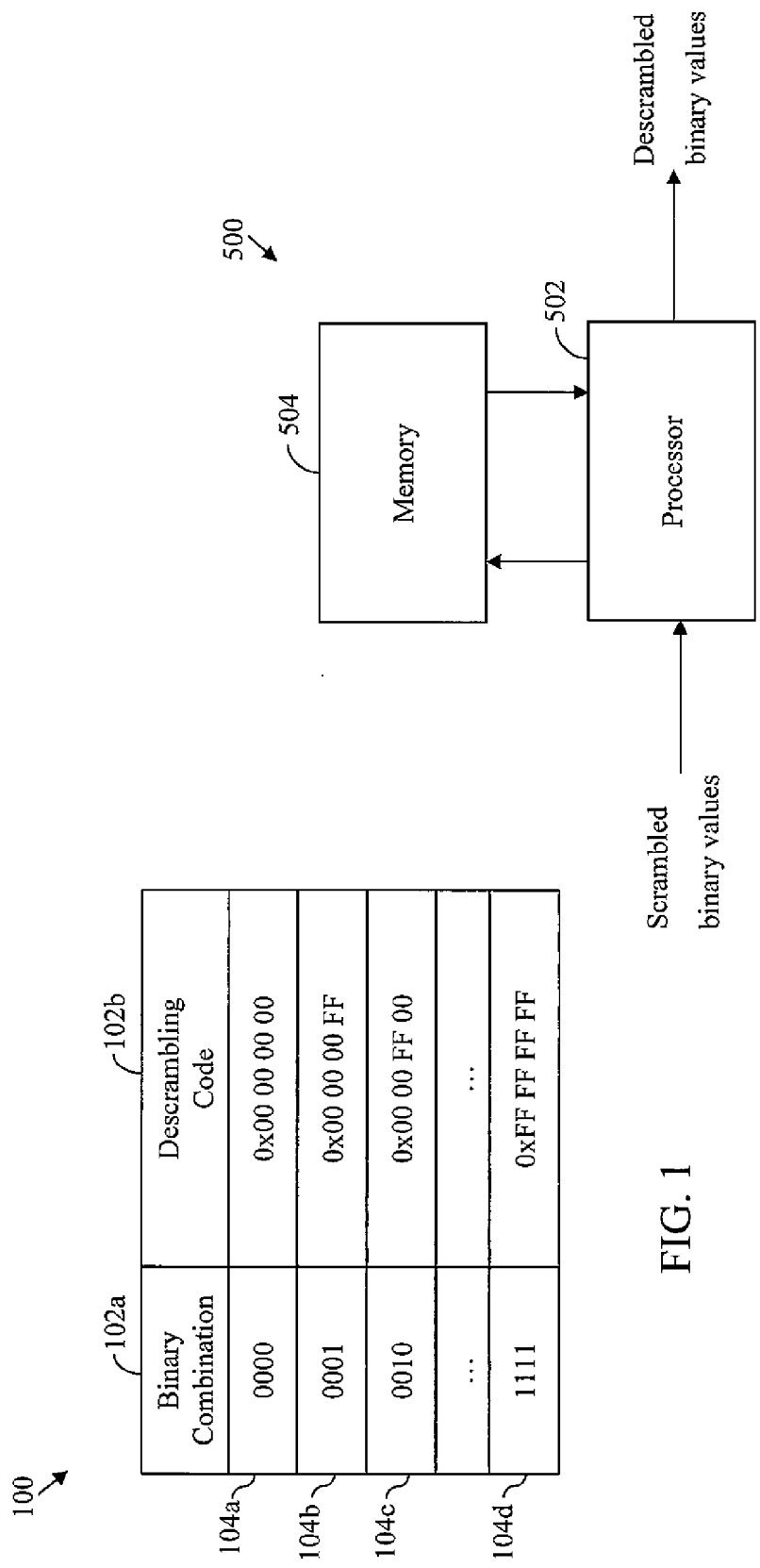
FIG. 1 is a schematic diagram illustrating a lookup table in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for descrambling sets of scrambled binary values is provided. The method includes receiving a first predetermined number of sets of scrambled binary values that were scrambled using a predefined flag bit sequence. A descrambling code is generated by repeating each bit of the predefined flag bit sequence for a second predetermined number that is equal to the bit length of a set of scrambled binary values. The first predetermined number of sets of descrambled binary values corresponding to the first predetermined number of sets of scrambled binary values is calculated using the at least one descrambling code and a predefined value. The predefined value is calculated using the first predetermined number and the bit length of a set of scrambled binary values.

In another embodiment of the present invention, a method for generating a lookup table used for descrambling one or more sets of scrambled binary values is provided. The method includes generating binary combinations, in which each binary combination has a bit length equal to a first predetermined number that is equal to a number of sets of scrambled binary values to be descrambled, preferably simultaneously. Descrambling codes corresponding to the binary combinations are generated by repeating each bit of the binary combination for a second predetermined number that is equal to the bit length of a set of scrambled binary values. Subsequently, the descrambling codes and the corresponding binary combinations are stored as the lookup table.

In yet another embodiment of the present invention, a method for descrambling one or more sets of scrambled binary values using a lookup table is provided. The lookup table includes descrambling codes and binary combinations. The method includes receiving a first predetermined number of sets of scrambled binary values to be descrambled, preferably simultaneously. The first predetermined number of sets of scrambled binary values is scrambled using a predefined flag bit sequence. Thereafter, a descrambling code corresponding to a binary combination is accessed from the lookup table, in which the binary combination is identical to the predefined flag bit sequence. Subsequently, the first predetermined number of sets of descrambled binary values corresponding to the first predetermined number of sets of scrambled binary values is calculated using the descrambling code and a predefined value. The predefined value is calculated using the first predetermined number and the bit length of a set of scrambled binary values.

In still another embodiment of the present invention, a method for descrambling one or more sets of scrambled binary values using a lookup table is provided. The lookup table includes descrambling codes and binary combinations. The method includes receiving a first predetermined number of sets of scrambled binary values to be descrambled. The first predetermined number of sets of scrambled binary values is scrambled using a predefined flag bit sequence. Thereafter, a descrambling code corresponding to a binary combination is accessed from the lookup table, in which the binary combination is identical to the predefined flag bit sequence. A first intermediate value is then calculated by ANDing the descrambling code and a predefined value, in which the predefined value is calculated using the first predetermined number and the bit length of a set of scrambled binary values. A second intermediate value is calculated by XORing the first predetermined number of sets of scrambled binary values and the descrambling code. Thereafter, the first intermediate value is added to the second intermediate value to obtain the first predetermined number of sets of descrambled binary values corresponding to the first predetermined number of sets of scrambled binary values.

In an embodiment of the present invention, a system for descrambling sets of scrambled binary values is provided. The system includes a processor for descrambling the sets of scrambled binary values and generating a descrambling code corresponding to the predefined flag bit sequence by repeating each bit of the predefined flag bit sequence for a predetermined number, in which the predetermined number is equal to the bit length of a set of scrambled binary values. A memory including a lookup table is coupled to the processor. The lookup table includes at least one binary combination and the at least one descrambling code corresponding to the at least one binary combination.

Various embodiments of the present invention provide a system and a method for descrambling sets of scrambled binary values. The method includes receiving sets of scrambled binary values that are to be descrambled substantially simultaneously. Thereafter, descrambling codes are either generated or accessed from a lookup table. Subsequently, the sets of scrambled binary values are descrambled, preferably substantially simultaneously, using a predefined flag bit sequence used for scrambling at a transmitter. Since the various sets of scrambled binary values are scrambled simultaneously, the descrambling operation is very efficient, which leads to improvement in MCPS and reduction in execution time.

Referring now to FIG. 1, a schematic diagram illustrating a lookup table 100 in accordance with an embodiment of the present invention is shown. The lookup table 100 includes columns 102a, and 102b and rows 104a, 104b, 104c, and 104d.

Column 102a includes binary combinations, in which each binary combination has a bit length equal to a first predetermined number, m. The first predetermined number m is equal to the number of sets of scrambled binary values that are to be simultaneously descrambled. In an embodiment of the present invention, the first predetermined number m is a positive integer that can have any value depending on a system implementation. In one example, m=4 and the sets of scrambled binary values are binary representations of the probabilistic estimates corresponding to a scrambled user data sequence.

The scrambled user data sequence is obtained by encoding a user data bit stream into a scrambled user data sequence at a transmitter using a predefined flag bit sequence. In a wireless system, the scrambled user data sequence is then transmitted to the receiver in the form of electromagnetic waves. In an embodiment of the present invention, the encoding is accomplished by performing a bitwise logical XOR operation on the user data sequence and the predefined flag bit sequence. The receiver then recovers the scrambled user data sequence. It should be understood by persons skilled in the art that the probabilistic estimates, also known as log likelihood ratios (LLRs), soft values, or equalized demodulated probabilistic estimates, indicate the probability of whether a recovered bit of a scrambled user data sequence is binary '1' or '0'. The probabilistic estimates are subsequently processed for descrambling scrambled user data. Column 102b includes descrambling codes that correspond to each binary combination. The method for generation of the descrambling codes is explained in detail in conjunction with FIG. 2.

Figure 2:
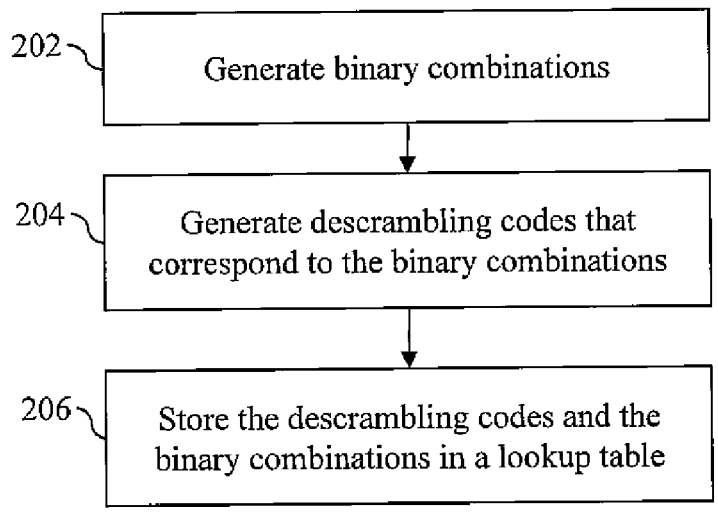
FIG. 2 is a flow chart illustrating a method for generating a lookup table in accordance with an embodiment of the present invention.

Referring now to FIG. 2, a flow chart illustrating a method for generating a lookup table in accordance with an embodiment of the present invention is shown. At step 202, binary combinations are generated in which each binary combination has a bit length equal to the first predetermined number m. The binary combinations are obtained by generating various possible unique binary sequences that can be obtained corresponding to a binary sequence having a bit length equal to m. Therefore, the number of unique binary combinations obtained corresponding to a binary sequence of bit length m is $2^m$. Each unique binary combination is identical to a predefined flag bit sequence (of a predetermined bit length) that may have been used to scramble the user data at a transmitter. Scrambling includes encoding a user data bit stream into a scrambled user data sequence at a transmitter using the predefined flag bit sequence. The encoded data is then transmitted to the receiver. In an embodiment of the present invention, the encoding is accomplished by performing a bitwise logical XOR operation on the user data sequence and the predefined flag bit sequence.

At step 204, descrambling codes are generated corresponding to each binary combination. The descrambling codes are generated by repeating each bit of the binary combination for a second predetermined number k. The second predetermined number is equal to the bit length of a set of scrambled binary values. In an example, when m=4, k=8, and one of the binary combinations is '0001' (cell of the lookup table 100 corresponding to the column 102a and row 104b), the hexadecimal equivalent of the corresponding descrambling code is '0x00 00 00 FF' (cell 102b, 104b of the lookup table 100). Similarly, the descrambling codes corresponding to the remaining binary combinations in rows 104a, 104c, and 104d are generated. Since, each binary combination corresponds to a predefined flag bit sequence, generating descrambling codes corresponding to each binary combination enables simultaneous descrambling of sets of scrambled binary values. At step 206, the lookup table 100 including the binary combinations and the corresponding descrambled codes is stored in a memory.

Figure 3:
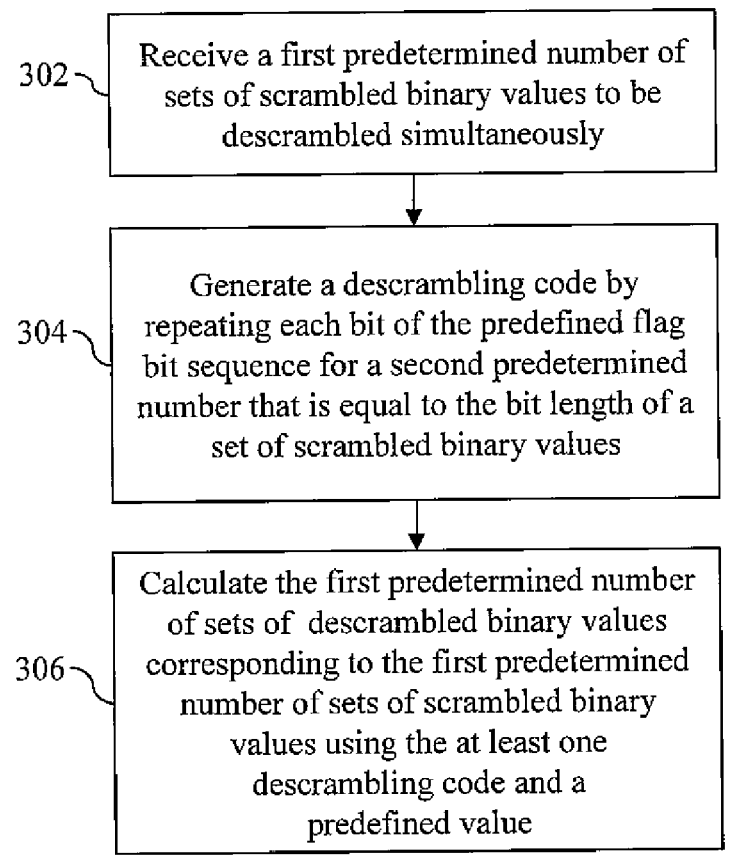
FIG. 3 is a flow chart illustrating a method for descrambling one or more sets of scrambled binary sequences in accordance with an embodiment of the present invention.

Referring now to FIG. 3, a flow chart illustrating a method for descrambling one or more sets of scrambled binary values in accordance with an embodiment of the present invention is shown.

At step 302, a first predetermined number m, of sets of scrambled binary values to be simultaneously descrambled is received at a receiver. In an embodiment of the present invention, the first predetermined number is a positive integer which can have any value depending on system implementation. In an example, m=4. Further, the sets of scrambled binary values are binary representations of the probabilistic estimates corresponding to a scrambled user data sequence, in which the scrambled user data has been scrambled using a predefined flag bit sequence at a transmitter. In an embodiment of the present invention, each set of scrambled binary values has a bit length equal to a second predetermined number k. In an embodiment of the present invention, the predefined flag bit sequence is transmitted from the transmitter to the receiver along with the scrambled user data for enabling descrambling of the scrambled user data. Further, it should be understood by persons skilled in the art that the probabilistic estimates indicate the probability of whether a recovered bit of a scrambled user data sequence is binary '1' or '0'. Therefore, each LLR corresponds to a bit of the scrambled user data sequence transmitted from the transmitter to the receiver. Further, since one bit of the predefined flag bit sequence was used to scramble one bit of the user data at the transmitter, each LLR (a set of scrambled binary values) is descrambled using a corresponding bit of the predefined flag bit sequence. In an embodiment of the present invention, the probabilistic estimates are at least one of LLRs, soft values, or equalized demodulated probabilistic estimates.

At step 304, a descrambling code is generated corresponding to the predefined flag bit sequence. Since, each bit of the flag bit sequence corresponds to a set of scrambled binary values to be simultaneously descrambled, the bit length of the flag bit sequence is equal to the number of sets of binary values received by the receiver, i.e., m. In an example, m=4. The generation of the descrambling code entails repeating each bit of the predefined flag bit sequence for a second predetermined number, i.e., k, in which the second predetermined number is equal to the bit length of a set of scrambled binary values. In an example, k=8. The method followed for generation of the descrambling code is identical to the generation of a descrambling code corresponding to a binary combination that has been explained in conjunction with step 204 (FIG. 2).

At step 306, the first predetermined number of sets of descrambled binary values corresponding to the first predetermined number of sets of scrambled binary values is calculated. In an embodiment of the present invention, the descrambling of the sets of scrambled binary values entails negating or not negating each set of scrambled binary values based on the value of a corresponding bit in the predefined flag bit sequence. In accordance with this method, a set of scrambled binary values is negated when the corresponding flag bit is binary '1' else the set of scrambled binary values is not negated. The above calculation is performed using the descrambling code generated corresponding to the predefined flag bit sequence and using a predefined value, CVALUE. In an embodiment of the present invention, CVALUE is calculated using the first predetermined number, m, and the bit length of a set of scrambled binary values, k. The predefined value may be calculated using the following equation:

$$CVALUE = \sum_{i=0}^{m-1} 2^{ik} \quad (1)$$

where CVALUE is a hexadecimal equivalent of the right hand side of equation (1). Therefore, when m=4 and k=8, CVALUE='0x1010101'. The method for calculation of the first predetermined number of sets of descrambled binary values is explained in detail with reference to FIG. 4.

Figure 4:
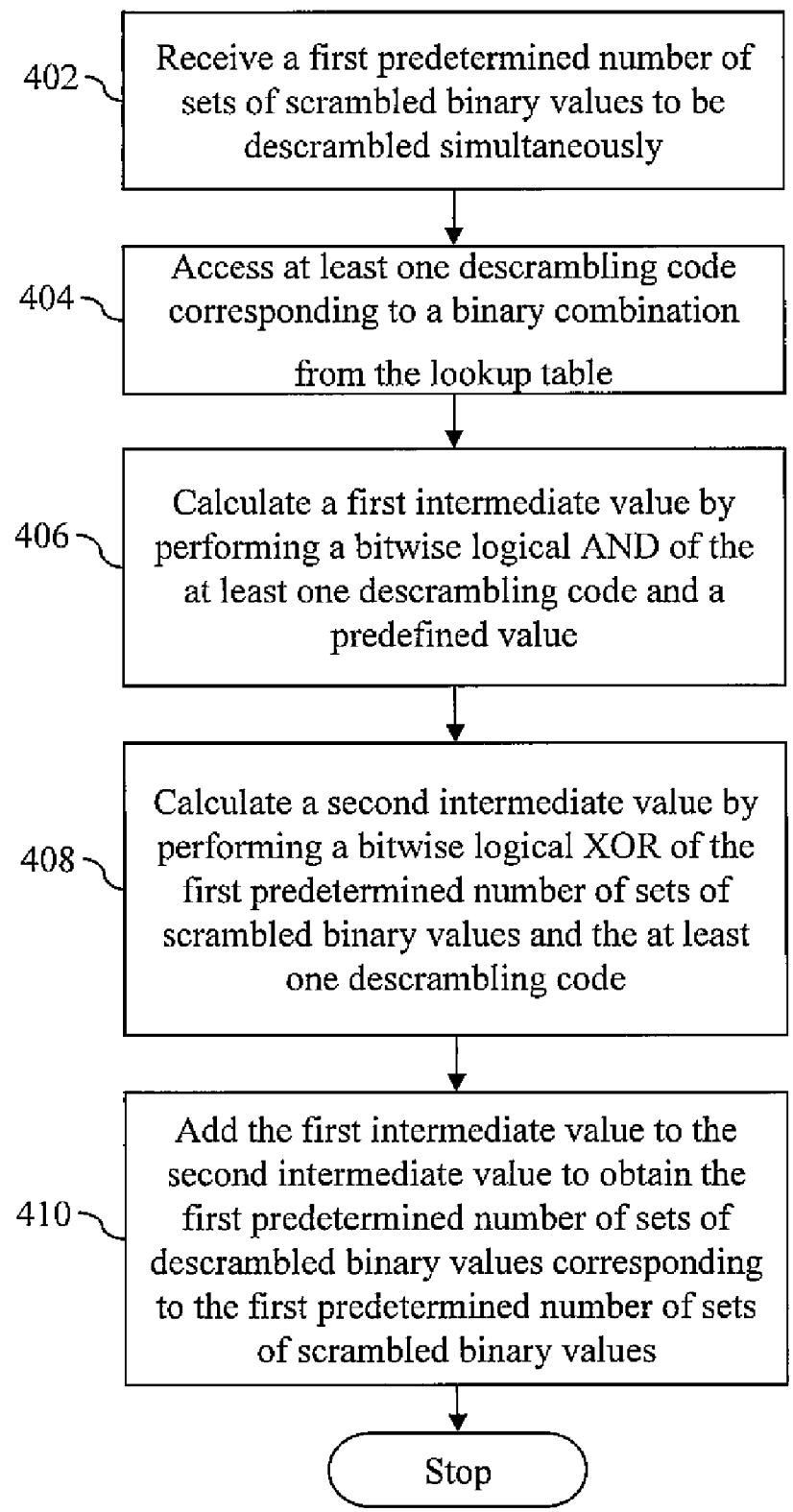
FIG. 4 is a flow chart illustrating a method for descrambling one or more sets of scrambled binary sequences in accordance with an embodiment of the present invention.

Referring now to FIG. 4, a flow chart illustrating a method for descrambling one or more sets of scrambled binary values in accordance with another embodiment of the present invention is shown. FIG. 4 will be now explained in detail in conjunction with FIGS. 1 and 3.

At step 402, a first predetermined number, i.e., m, of sets of scrambled binary values to be simultaneously descrambled is received at a receiver. Step 402 is identical to step 302, which has been explained in detail in conjunction with FIG. 3. In an example, m=4 and therefore four sets of scrambled binary values are received. An exemplary group of four sets of scrambled binary values, in which each set of scrambled binary values is eight (8) bits long is illustrated in Table A below:

TABLE A

| 11110010 | 00100011 | 10010000 | 01110010 |
| --- | --- | --- | --- |

At step 404, a descrambling code corresponding to a binary combination from the lookup table is accessed, in which the binary combination is identical to a predefined flag bit sequence used to scramble the m sets of scrambled binary values at a receiver end. For example, '0010' may be the predefined flag bit sequence used to obtain the sets of scrambled binary values illustrated in Table A. Therefore, the descrambling code corresponding to the binary combination '0010' is accessed from the lookup table 100, i.e., '00000000 00000000 11111111 00000000'. As described previously, a set of scrambled binary values is negated based on the value of a corresponding flag bit of the predefined flag bit sequence. When the flag bit is '1', the set is negated and vice versa. Thus, in the above example, the scrambled set corresponding to the flag bit having value '1' will be negated and the remaining sets will not be negated. In an embodiment of the present invention, the descrambling code may be generated corresponding to the predefined flag bit sequence during the run time execution of the various described methods in a manner as described in conjunction with step 304. In such a scenario the lookup table 100 is not generated.

At step 406, a first intermediate value IVALUE$_1$ is calculated by performing a bitwise logical AND operation on the descrambling code and a predefined value CVALUE. CVALUE is calculated using m, and the bit length of a set of scrambled binary values k. Calculation of the CVALUE was explained in detail in conjunction with step 306, in accordance with which CVALUE='0b00000001 00000001 00000001 00000001' corresponding to m=4 and k=8. In an embodiment of the present invention, CVALUE may be generated and stored prior to the run time execution of the various described methods. In another embodiment of the present invention, CVALUE is generated during run time execution using the values of m and k. Thereafter, bitwise logical AND operation is performed. In an example, using the exemplary values of the descrambling code as mentioned in step 404, and of the CVALUE as mentioned above yields $IVALUE_1$='00000000 00000000 00000001 00000000'.

At step 408, a second intermediate value $IVALUE_2$ is calculated by performing a bitwise logical XOR operation on the first predetermined number of sets of scrambled binary values and the descrambling code. In an example, using the exemplary values of sets of scrambled binary values as illustrated in Table A, and of the descrambling code as mentioned in step 404, $IVALUE_2$='11110010 00100011 01101111 01110010'. At step 410, the first intermediate value $IVALUE_1$ is added to the second intermediate value $IVALUE_2$ to obtain the first predetermined number of sets of descrambled binary values corresponding to the first predetermined number of sets of scrambled binary values. Each set of descrambled binary values of the first predetermined number of sets of descrambled binary values is obtained simultaneously, thereby enabling descrambling of the second predetermined number of sets of scrambled binary values in one operational cycle. Using the exemplary values of $IVALUE_1$ and $IVALUE_2$ as calculated in the above examples, the first predetermined number of sets of descrambled binary values obtained are illustrated in table B below:

TABLE B

| 11110010 | 00100011 | 01110000 | 01110010 |
| --- | --- | --- | --- |

It will be understood by persons skilled in the art that the third set of descrambled binary values from left in the Table B is the negated version of the third set of scrambled binary values from left in Table A. This is in accordance with the predefined flag bit sequence '0010', in which the third flag bit from the left is 1.

Referring now to FIG. 5, a system 500 for descrambling one or more sets of scrambled binary values in accordance with an embodiment of the present invention is shown. The system 500 includes a processor 502 and a memory 504. In one embodiment of the invention, the processor 502 and memory 504 are part of a wireless base band receiver and the scrambled data is data received from a wireless base station. However, as will be understood by those of skill in the art, the present invention is not limited to wireless base band receivers.

The processor 502 receives the sets of scrambled binary values. The sets of scrambled binary values are binary representations of the probabilistic estimates corresponding to a scrambled user data sequence, in which the scrambled user data has been scrambled using a predefined flag bit sequence at a transmitter. In an embodiment of the present invention, the predefined flag bit sequence is transmitted from the transmitter to the receiver along with the scrambled user data for enabling descrambling of the scrambled user data at the receiver. Thereafter, the processor 502 descrambles the sets of scrambled binary values using the steps or a combination of steps described in conjunction with FIGS. 2, 3, and 4. The processor 502 is coupled to the memory 504. The memory 504 stores a lookup table generated using the steps as described in conjunction with FIGS. 1 and 2. In another embodiment of the present invention, when the descrambling codes are generated during the run time execution of the various methods presently described, the memory 504 is not required, since in such a scenario a lookup table is not generated.

As will be understood by those of skill in the art, the present invention may be implemented in hardware, software, or a combination of hardware and software. When implemented in software (i.e., a computer program), the software usually will be stored on an internal memory of the processor. Thus, in one embodiment the present invention provides a computer program stored on a non-transitory computer readable medium for descrambling one or more sets of scrambled binary values using a lookup table (LUT). The LUT includes descrambling codes and a plurality of binary combinations. The computer program includes first program instructions that receive a first predetermined number of sets of scrambled binary values that were scrambled using a predefined flag bit sequence. Second program instructions access at least one descrambling code from the LUT corresponding to a binary combination that is identical to the predefined flag bit sequence. Third program instructions calculate a first intermediate value by performing a bitwise logical AND operation on the at least one descrambling code and a predefined value. The predefined value is calculated using the first predetermined number and the bit length of a set of scrambled binary values. Fourth program instructions calculate a second intermediate value by performing a bitwise logical XOR operation on the first predetermined number of sets of scrambled binary values and the at least one descrambling code. Fifth program instructions add the first intermediate value to the second intermediate value to obtain the first predetermined number of sets of descrambled binary values corresponding to the first predetermined number of sets of scrambled binary values.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A method for descrambling data, wherein the data includes one or more sets of scrambled binary values, the method comprising:
   receiving a first predetermined number of sets of scrambled binary values that were scrambled using a predefined flag bit sequence;
   generating at least one descrambling code by repeating each bit of the predefined flag bit sequence for a second predetermined number that is equal to a bit length of a selected one of the sets of the first predetermined number of sets of scrambled binary values; and
   calculating a third predetermined number of sets of descrambled binary values corresponding to the first predetermined number of sets of scrambled binary values using the at least one descrambling code and a predefined value, wherein the predefined value is calculated using the first predetermined number and the bit length of the selected one of the sets of the first predetermined number of sets of scrambled binary values.

2. The descrambling method of claim 1, wherein each bit of the predefined flag bit sequence corresponds to at least one set of the first predetermined number of sets of scrambled binary values.

3. The descrambling method of claim 2, wherein descrambling comprises negating a set of scrambled binary values based on the value of a corresponding bit in the predefined flag bit sequence.

4. The descrambling method of claim 1, wherein each set of scrambled binary values is at least one of a log likelihood ratio (LLR), a soft value, and an equalized demodulated probabilistic estimate.

5. The descrambling method of claim 1, wherein calculating the third predetermined number of sets of descrambled binary values comprises calculating a first intermediate value by performing a bitwise logical AND operation on the at least one descrambling code and the predefined value.

6. The descrambling method of claim 5, wherein calculating the third predetermined number of sets of descrambled binary values further comprises calculating a second intermediate value by performing a bitwise logical XOR operation on a set of scrambled binary values and the at least one descrambling code.

7. The descrambling method of claim 6, wherein calculating the third predetermined number of sets of descrambled binary values further comprises adding the first intermediate value to the second intermediate value.

8. A method for descrambling one or more sets of scrambled binary values using a lookup table, the lookup table comprising a plurality of descrambling codes and a plurality of binary combinations, the method comprising:
receiving a first predetermined number of sets of scrambled binary values to be descrambled simultaneously, wherein the first predetermined number of sets of scrambled binary values are scrambled using a predefined flag bit sequence;
accessing at least one descrambling code from the lookup table corresponding to a binary combination, wherein the binary combination is identical to the predefined flag bit sequence; and
calculating a corresponding second predetermined number of sets of descrambled binary values corresponding to the first predetermined number of sets of scrambled binary values using the at least one accessed descrambling code and a predefined value, wherein the predefined value is calculated using the first predetermined number and a bit length of a selected one of the first predetermined number of sets of scrambled binary values.

9. The descrambling method of claim 8, wherein each bit of the predefined flag bit sequence corresponds to at least one set of the first predetermined number of sets of scrambled binary values.

10. The descrambling method of claim 9, wherein descrambling comprises negating a set of scrambled binary values based on the value of a corresponding bit in the predefined flag bit sequence.

11. The descrambling method of claim 8, wherein each set of scrambled binary values is a log likelihood ratio (LLR), a soft value, and an equalized demodulated probabilistic estimate.

12. The descrambling method of claim 8, wherein calculating the second predetermined number of sets of descrambled binary values comprises calculating a first intermediate value by performing a bitwise logical AND operation on the at least one descrambling code and the predefined value.

13. The descrambling method of claim 12, wherein calculating the second predetermined number of sets of descrambled binary values further comprises performing a bitwise logical XOR operation on a set of scrambled binary values and the at least one descrambling code to obtain a second intermediate value.

14. The descrambling method of claim 13, wherein calculating the second predetermined number of sets of descrambled binary values further comprises adding the first intermediate value to the second intermediate value.

15. A method for descrambling one or more sets of scrambled binary values using a lookup table, the lookup table comprising a plurality of descrambling codes and a plurality of binary combinations, the method comprising:
receiving a first predetermined number of sets of scrambled binary values to be descrambled simultaneously, wherein the first predetermined number of sets of scrambled binary values are scrambled using a predefined flag bit sequence;
accessing at least one descrambling code from the lookup table corresponding to a binary combination, wherein the binary combination is identical to the predefined flag bit sequence;
calculating a first intermediate value by performing a bitwise logical AND operation on the at least one descrambling code and a predefined value, wherein the predefined value is calculated using the first predetermined number and a bit length of one of the sets of the first predetermined number of sets of scrambled binary values;
calculating a second intermediate value by performing a bitwise logical XOR operation on the first predetermined number of sets of scrambled binary values and the at least one descrambling code; and
adding the first intermediate value to the second intermediate value to a first predetermined number of sets of descrambled binary values corresponding to the first predetermined number of sets of scrambled binary values.

16. The descrambling method of claim 15, wherein scrambling comprises encoding a bit stream into the first predetermined number of sets of scrambled binary values using the predefined flag bit sequence, wherein each bit of the predefined flag bit sequence corresponds to a bit of the bit stream.

17. The descrambling method of claim 16, wherein each bit of the predefined flag bit sequence corresponds to at least one set of scrambled binary values.

18. The descrambling method of claim 17, wherein descrambling comprises negating a set of scrambled binary values based on the value of a corresponding bit in the predefined flag bit sequence.

19. The descrambling method of claim 15, wherein each set of scrambled binary values is a log likelihood ratio (LLR).

* * * * *